US012764311B2

(12) United States Patent
Richter et al.

(10) Patent No.: US 12,764,311 B2
(45) Date of Patent: Oct. 13, 2026

(54) APPARATUS AND METHOD FOR DIRECTION SENSITIVE DEBAYERING IN JPEG XS

(71) Applicant: Fraunhofer-Gesellschaft zur Förderung der angewandten Forschung e.V., Munich (DE)

(72) Inventors: Thomas Richter, Erlangen (DE); Siegfried Fößel, Erlangen (DE); Christian Minuth, Erlangen (DE); Christian Scherl, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 74 days.

(21) Appl. No.: 19/018,420

(22) Filed: Jan. 13, 2025

(65) Prior Publication Data

US 2026/0205611 A1 Jul. 16, 2026

(51) Int. Cl.
*H04N 19/42* (2014.01)
*H04N 19/132* (2014.01)
(Continued)

(52) U.S. Cl.
CPC ......... *H04N 19/186* (2014.11); *H04N 19/132* (2014.11); *H04N 19/182* (2014.11); *H04N 19/42* (2014.11); *H04N 23/84* (2023.01)

(58) Field of Classification Search
CPC ...... H04N 23/80; H04N 23/84; H04N 23/843; H04N 19/42; G06T 3/4015
(Continued)

(56) References Cited

U.S. PATENT DOCUMENTS 3,971,065 A 7/1976 Bayer
10,297,008 B2 * 5/2019 Demos .................. H04N 19/61
(Continued)

FOREIGN PATENT DOCUMENTS

WO WO-2023083245 A1 * 5/2023 ........... H04N 19/119

OTHER PUBLICATIONS

International Search Report and Written Opinion dated Apr. 1, 2026, issued in application No. PCT/EP2026/050577.
(Continued)

*Primary Examiner* — Anthony J Daniels
(74) *Attorney, Agent, or Firm* — McClure, Qualey & Rodack, LLP

(57) ABSTRACT

An apparatus includes a luma interpolator for determining a luma component for each of the first position and the fourth position of each of the plurality of 2×2 superpixels. An alias canceller conducts alias cancellation by determining a first updated chroma component for the first position and by determining a second updated chroma component for the fourth position for each of the plurality of 2×2 superpixels. A chrominance interpolator configured for determining a first chroma component for each of the second position, the third position and the fourth position of each of the plurality of 2×2 superpixels, and for determining a second chroma component for each of the first position, the second position and the third position of each of the plurality of 2×2 superpixels. And, a component transformator configured for generating for each position of the plurality of 2×2 superpixels at least three sample values for said position.

29 Claims, 4 Drawing Sheets
(1 of 4 Drawing Sheet(s) Filed in Color)

(51) Int. Cl.
*H04N 19/182* (2014.01)
*H04N 19/186* (2014.01)
*H04N 23/84* (2023.01)

(58) Field of Classification Search
USPC .......................................................... 348/221.1
See application file for complete search history.

(56) References Cited

U.S. PATENT DOCUMENTS

| | | | | |
|---|---|---|---|---|
| 12,063,391 | B2 | 8/2024 | Richter | |
| 2017/0289404 | A1 | 10/2017 | Nishimura | |
| 2020/0014923 | A1 | 1/2020 | Foessel | |
| 2024/0078628 | A1 * | 3/2024 | Obert | G06T 1/20 |

OTHER PUBLICATIONS

Pei, S.C., et al.; "Effective color interpolation in CCD color filter array using signal correlation;" Proceedings 2000 International Conference on Image Processing; vol. 3; 2000; pp. 488-491.

Pei, S.C., et al.; "Effective color interpolation in CCD color filter arrays using signal correlation;" IEEE Transactions on Circuits and Systems for Video Technology; vol. 13; No. 6; Jun. 2003; pp. 503-513.

Malvar, H.S., et al.; "High-quality linear interpolation for demosaicing of Bayer-patterned color images;" 2004 IEEE International Conference on Acoustics, Speech, and Signal Processing; 2004; pp. iii-485.

Hirakawa, K., et al.; "Adaptive homogeneity-directed demosaicing algorithm;" IEEE Transactions on Image Processing; vol. 14; No. 3; Mar. 2005; pp. 360-369.

Pekkucuksen, I., et al.; "Gradient based threshold free color filter array interpolation;" 2010 IEEE International Conference on Image Processing; Sep. 2010; pp. 137-140.

Pekkucuksen, I., et al.; "Edge oriented directional Color Filter Array interpolation;" 2011 IEEE International Conference on Acoustics, Speech and Signal Processing (ICASSP); 2011; pp. 993-996.

Pekkucuksen, I., et al.; "Edge Strength Filter Based Color Filter Array Interpolation;" IEEE Transactions on Image Processing; vol. 21; No. 1; Jan. 2012; pp. 393-397.

Monno, Y., et al.; "Adaptive residual interpolation for color image demosaicking;" 2015 IEEE International Conference on Image Processing (ICIP); 2015; pp. 3861-3865.

Malvar, H.S., et al.; "Progressive-to-Lossless Compression of Color-Filter-Array Images using Macropixel Spectral-Spatial Transformation;" Proc. of Data Compression Conf.; 2012; pp. 1-11.

Suzuki, T.; "Lossless compression of CFA-sampled images using YDgCoCg transforms with CDF wavelets;" Proc. of Intl. Conf. on Image Proc. (ICIP); 2018; pp. 1143-1147.

Richter, T., et al.; "Bayer Pattern Compression with JPEG XS;" 2019 IEEE International Conference on Image Processing (ICIP); 2019; pp. 3177-3181.

Richter T., et al.; "Bayer CFA Pattern Compression With JPEG XS;" IEEE Transactions on Image Processing; vol. 30; 2021; pp. 6557-6569.

Richter, T., et al.; "Entropy Coding and Entropy Coding Improvements of JPEG XS;" Proc. of Data Compression Conf.; 2018; pp. 1-11.

Coffin, D.; "dcraw, Decoding raw digital photos in Linux;" pp. 1-20 http://www.dechifro.org/dcraw/.

Descampe, A., et al.; "JPEG XS—A New Standard for Visually Lossless Low-Latency Lightweight Image Coding;" Proceedings of the IEEE; vol. 109; No. 9; Sep. 2021; pp. 1559-1577.

Richter, T., et al.; "JPEG-XS, A high quality mezzanine image codec for video over IP;" SMPTE Motion Imaging Journal; Oct. 2018; pp. 1-15.

International Standard; "Information Technology—JPEG 2000 Image Coding System;" ISO/IEC as 15444-1; Oct. 2019; pp. 1-234.

Taubman, D.S., et al.; "JPEG2000: Image Compression, Fundamentals, Standards and Practise;" Kluwer Academic Publishers; 2002; pp. 1-779.

International Standard; "Information technology—JPEG XS low-latency lightweight image coding system, Part 1: Core coding system;" ISO/IEC 21122-1; 2022; pp. 1-108.

* cited by examiner

APPARATUS AND METHOD FOR DIRECTION SENSITIVE DEBAYERING IN JPEG XS

BACKGROUND OF THE INVENTION

The present invention relates to an apparatus and a method for direction sensitive debayering in JPEG XS reconstruction.

The JPEG XS (ISO/IEC 21122-1) standard created by the JPEG committee is a low-complexity, low-latency image compression codec for transmission of video signals over IP networks.

Unlike many former standards developed by ISO/IEC SC29WG1, JPEG XS [17, 14] aims to provide a low complexity "mezzanine" codec for video-over-IP solutions, as for example typically deployed in post-production. Digital cameras as used in movie or video production typically deploy a Color Filter Array (CFA) type of sensor comprising sensor elements covered by alternating patterns of red and green, and green and blue filter elements. While traditionally the sensor output is already processed into a true-color image at the camera, it has been seen in [12, 13] that substantial compression gains of over 4 dB can be obtained by compressing sensor signals directly rather than the RGB signal generated by a demosaiking algorithm. Additional advantages of recording or transmitting the CFA signal rather than an RGB signal are that it reduces the complexity at the camera, and also leaves additional artistic freedom when processing the signal later.

JPEG XS supports compression of "Bayer Pattern" signals [11]. An extended multi-component decorrelation filter improves the compression efficiency on CFA Bayer pattern input data. While the JPEG XS decoder for such data requires to process a bitstream containing CFA Bayer data through the inverse multi-component decorrelation generating a CFA Bayer pattern as final output, it is in some applications desirable to also generate an observable RGB image right at the output of the decoder, e.g. to enable a quick preview on the picture taken.

To improve coding efficiency, JPEG XS performs an additional preprocessing step denoted as "Star-Tetrix Transformation" that decorrelates the signals of the sensor elements [12, 13]. As every sample position in a Bayer pattern only describes one out of three color channels, an additional post-processing step is required to recover from the output of a JPEG XS decoder a true-color image suitable for human observation [1, 2, 3, 4, 5, 6, 7, 8]. However, many of the above algorithms are quite complex and conflict with the low complexity design goals of the JPEG XS standard.

It would be highly beneficial if improved concepts for debayering in JPEG XS reconstruction would be provided.

SUMMARY

An apparatus for reconstructing an image from image information comprising a plurality of 2×2 superpixels of the image according to an embodiment is provided. The apparatus comprises a luma interpolator configured for determining a luma component for each of the first position and the fourth position of each of the plurality of 2×2 superpixels. Furthermore, the apparatus comprises an alias canceller for conducting alias cancellation by determining a first updated chroma component for the first position and by determining a second updated chroma component for the fourth position for each of the plurality of 2×2 superpixels. Moreover, the apparatus comprises a chrominance interpolator configured for determining a first chroma component for each of the second position, the third position and the fourth position of each of the plurality of 2×2 superpixels, and for determining a second chroma component for each of the first position, the second position and the third position of each of the plurality of 2×2 superpixels. Furthermore, the apparatus comprises a component transformator configured for generating for each position of the plurality of 2×2 superpixels at least three sample values for said position.

Moreover, a method for reconstructing an image from image information comprising a plurality of 2×2 superpixels of the image. The method comprises:

- Determining a luma component for each of the first position and the fourth position of each of the plurality of 2×2 superpixels.
- Conducting alias cancellation by determining a first updated chroma component for the first position and by determining a second updated chroma component for the fourth position for each of the plurality of 2×2 superpixels.
- Determining a first chroma component for each of the second position, the third position and the fourth position of each of the plurality of 2×2 superpixels.
- Determining a second chroma component for each of the first position, the second position and the third position of each of the plurality of 2×2 superpixels. And:
- Generating for each position of the plurality of 2×2 superpixels at least three sample values for said position.

Furthermore, a non-transitory computer-readable medium comprising computer-readable instructions according to an embodiment is provided, which, when being executed by a computer or signal processor, carry out the above-described method.

Moreover, a camera comprising a JPEG XS encoder for generating an encoded signal encoding an image according to an embodiment is provided. The camera comprises a preview monitor, wherein the camera comprises a processor that decodes the encoded signal according to the above-described method to obtain an RGB image.

Furthermore, a camera comprising a JPEG XS encoder for generating an encoded signal encoding an image according to an embodiment is provided. The camera comprises a preview monitor, wherein the camera comprises a processor for obtaining an RGB image, wherein the processor implements an apparatus according to the above-described embodiment.

Embodiments provide a low-complexity demosaicking algorithm that reduces complexity of the reconstruction procedure by combining the JPEG XS (ISO/IEC 21122-1) inverse multi-component decorrelation transformation with a demosaicking step, noting that some steps of the JPEG XS reconstruction procedure and typical demosaicking algorithms can be skipped and combined. Thus, embodiments provide a demosaicking algorithm of modest complexity depending on the particular design of the JPEG XS CFA Bayer pattern coding process.

Moreover, embodiments provide a simple, yet efficient reconstruction of JPEG XS compressed Bayer Pattern signals to RGB signals operating directly on the output of intermediate steps of the JPEG XS reconstruction transformation and thus reducing complexity for generating observable RGB images from compressed Bayer pattern signals.

Furthermore, embodiments provide an CFA to RGB post-processing filter that can be merged with the inverse decorrelation transformation defined in the JPEG XS standard.

Before embodiments of the present invention are described in detail using the accompanying figures, it is to be pointed out that the same or functionally equal elements are given the same reference numbers in the figures and that a repeated description for elements provided with the same reference numbers is omitted. Hence, descriptions provided for elements having the same reference numbers are mutually exchangeable.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
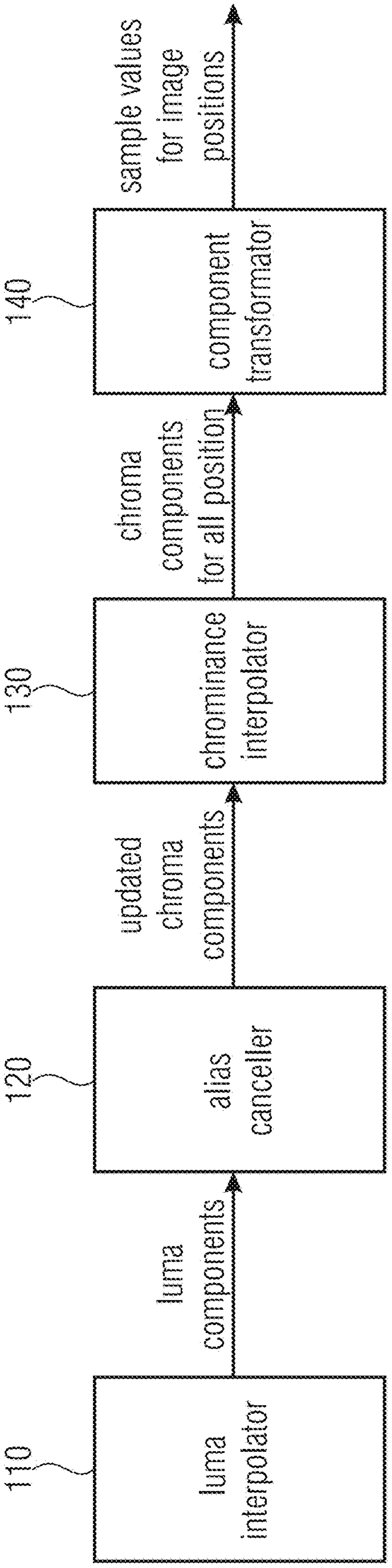
FIG. 1 illustrates an apparatus for reconstructing an image from image information comprising a plurality of 2×2 superpixels of the image according to an embodiment.

Before particular embodiments are described in detail, at first, the JPEG XS CFA Bayer reconstruction process is described in detail:

JPEG XS treats CFA Bayer pattern images as four-component images comprising the components Y, $C_b$, $C_r$ and Δ. The first component is an approximate luma signal, the second two approximate chroma signals and the last a luma-difference signal. While the inverse decorrelation algorithm used to generate form the Y, $C_b$, $C_r$, Δ quadruple the samples of a CFA Bayer pattern is described in the standard, it will be quickly recapitulated here for clarity.

As background information only, the operation of a JPEG XS decoder is explained.

In the first step, a JPEG XS decoder rearranges samples of the four components to form superpixels of 2×2 samples each such that each superpixel contains all four components from identical spatial positions. CFA Bayer pattern supports four possible sample arrangements:

| | |
|---|---|
| Cr | Δ |
| Y | Cb |

| | |
|---|---|
| Cb | Δ |
| Y | Cr |

| | |
|---|---|
| Δ | Cr |
| Cb | Y |

| | |
|---|---|
| Δ | Cb |
| Cr | Y |

For the sake of simplicity, only the leftmost arrangement will be discussed, all other arrangements will be handled similarly. It should be noted that the entire picture then looks like one large plane with a repeated superpixel sample arrangement as given in one of the 2×2 matrices shown above:

| | | | | | | | | | |
|---|---|---|---|---|---|---|---|---|---|
| Cr | Δ | Cr | Δ | Cr | Δ | Cr | Δ | Cr | Δ |
| Y | Cb | Y | Cb | Y | Cb | Y | Cb | Y | Cb |
| Cr | Δ | Cr | Δ | Cr | Δ | Cr | Δ | Cr | Δ |
| Y | Cb | Y | Cb | Y | Cb | Y | Cb | Y | Cb |
| Cr | Δ | Cr | Δ | Cr | Δ | Cr | Δ | Cr | Δ |
| Y | Cb | Y | Cb | Y | Cb | Y | Cb | Y | Cb |

In the second step, the code reconstructs $Y_2$ samples by subtracting ⅛ of the sum of the Δ samples to the diagonal left top, right top, left bottom and right bottom. That is, $$Y_2(s,t) = Y(s,t) - (\Delta(s-1,t-1) + \Delta(s+1,t-1) + \Delta(s-1,t+1) + \Delta(s+1,t+1))/8 \tag{a1}$$

where s and t are the spatial locations of the samples to be involved in the computation. For a more compact representation, the relative location of a sample is indicated as a superscript where “l” stands for “left of”, “r” “right of”, “b” “bottom” and “t” for top.

To illustrate the abbreviations from a position P, see the following:

| | | | | |
|---|---|---|---|---|
| | ttl | tt | ttr | |
| tll | tl | t | tr | trr |
| ll | l | P | r | rr |
| bll | bl | b | br | brr |
| | bbl | bb | bbr | |

wherein P indicates the position, wherein l indicates left, wherein r indicates right, wherein t indicates top, wherein b indicates bottom, wherein ll indicates left left (two steps to the left), wherein rr indicates right right (two steps to the right), wherein tt indicates top top (two steps to the top), wherein bb indicates bottom bottom (two steps to the bottom), wherein tll indicates top left left (one step to the top, two steps to the left), wherein trr indicates top right right (one step to the top, two steps to the right), wherein bll indicates bottom left left (one step to the bottom, two steps to the left), wherein brr indicates bottom right right (one step to the bottom, two steps to the right), wherein ttl indicates top top left (two steps to the top, one step to the left), wherein ttr indicates top top right (two steps to the top, one step to the right), wherein bbl indicates bottom bottom left (two steps to the bottom, one step to the left), wherein bbr indicates bottom bottom right (two steps to the bottom, one step to the right), The above equation then reads $$Y_2 = Y - \left(\Delta^{lt} + \Delta^{rt} + \Delta^{lb} + \Delta^{rb}\right)/8 \tag{a2}$$

In the third step, a first luma component $Y_1$ is reconstructed from $Y_2$ and $\Delta$ by adding the average of the $Y_2$ components diagonally surrounding the $\Delta$ component to $\Delta$:

$$Y_1 = \Delta + \left(Y_2^{lt} + Y_2^{rt} + Y_2^{lb} + Y_2^{rb}\right)/4 \tag{a3}$$

The above steps result in the following matrix:

| | | | | | | | | | |
|---|---|---|---|---|---|---|---|---|---|
| Cr | $Y_1$ | Cr | $Y_1$ | Cr | $Y_1$ | Cr | $Y_1$ | Cr | $Y_1$ |
| $Y_2$ | Cb | $Y_2$ | Cb | $Y_2$ | Cb | $Y_2$ | Cb | $Y_2$ | Cb |
| Cr | $Y_1$ | Cr | $Y_1$ | Cr | $Y_1$ | Cr | $Y_1$ | Cr | $Y_1$ |
| $Y_2$ | Cb | $Y_2$ | Cb | $Y_2$ | Cb | $Y_2$ | Cb | $Y_2$ | Cb |
| Cr | $Y_1$ | Cr | $Y_1$ | Cr | $Y_1$ | Cr | $Y_1$ | Cr | $Y_1$ |
| $Y_2$ | Cb | $Y_2$ | Cb | $Y_2$ | Cb | $Y_2$ | Cb | $Y_2$ | Cb |

Then, JPEG XS decoder continues processing:

In the fourth step, two green components are reconstructed by subtracting a weighted sum of the Cb and Cr components surrounding $Y_1$ and $Y_2$. The weights are powers of 2 with weights wb and wr:

$$G_1 = Y_1 - \left(2^{wb} \times Cb^t + 2^{wb} \times Cb^b + 2^{wr} \times Cr^l + 2^{wr} \times Cr^r\right)/8 \tag{a4}$$

$$G_2 = Y_2 - \left(2^{wb} \times Cb^l + 2^{wb} \times Cb^r + 2^{wr} \times Cr^t + 2^{wr} \times Cr^b\right)/8 \tag{a5}$$

(See [20]: Richter T., Minuth C., U.S. Pat. No. 12,063,391 B2, date of patent: Aug. 13, 2024.)

In the last step, the red and blue components are reconstructed by adding the average of the surrounding green components to Cb and Cr:

$$R = Cr + \left(G_1^l + G_1^r + G_2^t + G_2^b\right)/4 \tag{a6}$$

$$B = Cb + \left(G_1^t + G_1^b + G_2^l + G_2^r\right)/4 \tag{a7}$$

These steps, executed in order, result in a CFA Bayer pattern that comprises 2×2 superpixels in the order R,$G_1$, $G_2$,B, from left to right, top to bottom. Thus, the reconstructed CFA pattern looks as follows:

| | | | | | | | | | |
|---|---|---|---|---|---|---|---|---|---|
| R | $G_1$ | R | $G_1$ | R | $G_1$ | R | $G_1$ | R | $G_1$ |
| $G_2$ | B | $G_2$ | B | $G_2$ | B | $G_2$ | B | $G_2$ | B |
| R | $G_1$ | R | $G_1$ | R | $G_1$ | R | $G_1$ | R | $G_1$ |
| $G_2$ | B | $G_2$ | B | $G_2$ | B | $G_2$ | B | $G_2$ | B |
| R | $G_1$ | R | $G_1$ | R | $G_1$ | R | $G_1$ | R | $G_1$ |
| $G_2$ | B | $G_2$ | B | $G_2$ | B | $G_2$ | B | $G_2$ | B |

If a true color output is desired, i.e. an image that comprises a red, green and blue sample value at each sample grid point position, then a demosaicking algorithm such as bilinear interpolation, the AHD algorithm [19] or the algorithm from [2] may, e.g., be used. There are, however, multiple other alternative algorithms for demosaicking known and the above three alternatives just constitute examples.

In the following, de-Bayering algorithms/algorithms for demosaiking CFA pattern signals are now provided. The algorithms from [1, 4] are of particular importance as they share some ideas with the above decorrelation transformation and thus contribute to the provided algorithm.

For the purpose of embodiments, it is important to note that the $C_b$ and $C_r$ components are already an output of the inverse wavelet transformation of JPEG XS and do not need to be computed anymore; however, they correspond to red/green difference values from different spatial locations and are thus prone to aliasing.

In the following, embodiments of the present invention are presented with reference to FIG. 1:

FIG. 1 illustrates an apparatus for reconstructing an image from image information comprising a plurality of 2×2 superpixels of the image according to an embodiment.

Each of the plurality of 2×2 superpixels comprises one first chroma component at a first position of the 2×2 superpixels, one first luma component at a second position of the 2×2 superpixels, one second luma component at a third position of the 2×2 superpixels, and one second chroma component at a fourth position of the 2×2 superpixels.

For example, in one of the 2×2 superpixels, the first chroma component $C_1$ and second chroma component $C_2$ and the first luma component $Y_1$ and second luma component $Y_2$ may, e.g., be arranged as follows

| | |
|---|---|
| $C_1$ | $Y_1$ |
| $Y_2$ | $C_2$ |

with such an arrangement, the positions would then be defined as follows:

| | |
|---|---|
| 1 | 2 |
| 3 | 4 |

Other arrangements of the chroma components and of the luma components are likewise possible, for example (the arrangements are presented together with the corresponding positions:

| | |
|---|---|
| $Y_1$ | $C_1$ |
| $C_2$ | $Y_2$ |

| | |
|---|---|
| 2 | 1 |
| 4 | 3 |

or, for example

| | |
|---|---|
| $Y_2$ | $C_1$ |
| $C_2$ | $Y_1$ |

| | |
|---|---|
| 3 | 1 |
| 4 | 2 |

or, for example

| | |
|---|---|
| $C_2$ | $Y_1$ |
| $Y_2$ | $C_1$ |

| | |
|---|---|
| 4 | 2 |
| 3 | 1 |

Moreover, it is understood, that in a first embodiment, $C_1$=Cr and $C_2$=Cb.

In a second embodiment, $C_1$=Cb and $C_2$=Cr.

The apparatus of FIG. 1 comprises a luma interpolator 110, which is configured for determining a luma component for each of the first position and the fourth position of each of the plurality of 2×2 superpixels depending on luma components at neighboring positions of said position within the image, depending on a chroma component at said position and depending on chroma components at neighboring positions of said position within the image.

Furthermore, it is understood that the positions of $Y_1$ and $Y_2$ can be switched.

Furthermore, the apparatus comprises an alias canceller 120 configured for conducting alias cancellation by determining a first updated chroma component for the first position for each of the plurality of 2×2 superpixels using the first chroma component at the first position depending on the luma component at the first position being determined by the luma interpolator and depending on luma components at neighboring positions of the first position within the image; and by determining a second updated chroma component for the fourth position for each of the plurality of 2×2 superpixels using the second chroma component at the fourth position depending on the luma component at the fourth position being determined by the luma interpolator and depending on luma components at neighboring positions of the fourth position within the image.

Moreover, the apparatus comprises a chrominance interpolator 130 configured for determining a first chroma component for each of the second position, the third position and the fourth position of each of the plurality of 2×2 superpixels depending on first updated chroma components at neighboring positions of said position within the image. The chrominance interpolator 130 is configured for determining a second chroma component for each of the first position, the second position and the third position of each of the plurality of 2×2 superpixels depending on second updated chroma components at neighboring positions of said position within the image.

Furthermore, the apparatus comprises a component transformator 140 configured for generating from the first chroma component or from the first updated chroma component, from the second chroma component or from the second updated chroma component, and from a luma component of each position of each of the plurality of 2×2 superpixels at least three sample values for said position.

In the following, luminance interpolation according to particular embodiments is described:

In an embodiment, the luma interpolator 110 may, e.g., be configured to determine the luma component for the first position of each of the plurality of 2×2 superpixels by

- determining a first luma candidate value for the first position depending on two luma components at neighboring positions in a vertical direction from the first position within the image, depending on the first chroma component at the first position and depending on two further chroma components located in the vertical direction within the image from the first position,
- determining a second luma candidate value for the first position depending on two luma components at neighboring positions in a horizontal direction from the first position within the image depending on the first chroma component at the first position and depending on two further chroma components located in the horizontal direction within the image from the first position, and
- selecting the luma component for the first position from the first luma candidate value for the first position and the second luma candidate value for the first position depending on a selection criterion.

Moreover, the luma interpolator 110 may, e.g., be configured to determine the luma component for the fourth position of each of the plurality of 2×2 superpixels by

- determining a first luma candidate value for the fourth position depending on two luma components at neighboring positions in a vertical direction from the fourth position within the image, depending on the second chroma component at the fourth position and depending on two further chroma components located in the vertical direction within the image from the fourth position,
- determining a second luma candidate value for the fourth position depending on two luma components at neighboring positions in a horizontal direction from the fourth position within the image, depending on the second chroma component at the fourth position and depending on two further chroma components located in the horizontal direction within the image from the fourth position, and
- selecting the luma component for the fourth position from the first luma candidate value for the fourth position and the second luma candidate value for the fourth position depending on a selection criterion.

According to an embodiment, the luma interpolator may, e.g., be configured to select the luma component for each of the first position and the fourth position from the first luma candidate value for said position and the second luma candidate value for said position by determining a first variance for the first luma candidate value for said position, by determining a second variance for the second luma candidate value for said position, and by selecting a luma candidate value for said position from the first luma candidate value for said position and from the second luma candidate value for said position having a smaller variance than the other luma candidate value.

In an embodiment, the luma interpolator 110 may, e.g., be configured to determine the first variance for said position depending on the first luma candidate value for said position and depending on the two neighboring luma components of said position in the vertical direction. Moreover, the luma interpolator 110 may, e.g., be configured to determine the second variance for said position depending on the second luma candidate value for said position and depending on the two neighboring luma components of said position in the horizontal direction.

According to an embodiment, a position is considered to be a neighboring position of another position, if it can be reached by at most two steps in a vertical direction and at most two steps in a horizontal direction.

In an embodiment, the luma interpolator 110 may, e.g., be configured to determine the first luma candidate value and the second luma candidate value for the first position further depending on the first chroma component at the first position. Furthermore, the luma interpolator 110 may, e.g., be configured to determine the first luma candidate value and the second luma candidate value for the fourth position further depending on the second chroma component at the fourth position.

In an embodiment, the two further chroma components located in the vertical direction are a nearest chroma component in a top direction from the first or fourth position and a nearest chroma component in a bottom direction from the first or fourth position. The two further chroma components located in the horizontal direction may, e.g., be a nearest chroma component in a left direction from the first or fourth position and a nearest chroma component in a right direction from the first or fourth position.

According to an embodiment, the luma interpolator 110 may, e.g., be configured to determine the first luma candidate value for the first position depending on:

$$Y_{v1} = (Y_2^t + Y_2^b + C_1)/2 - (C_1^{tt} + C_1^{bb})/4 \tag{b1}$$

wherein the luma interpolator 110 may, e.g., be configured to determine the first luma candidate value for the fourth position depending on:

$$Y_{v2} = (Y_1^t + Y_1^b + C_2)/2 - (C_2^{tt} + C_2^{bb})/4 \tag{b2}$$

wherein:

$Y_{v1}$ or $Y_{v2}$ indicates the first luma candidate value, $Y_2^t$, $Y_2^b$ or $Y_1^t$, $Y_1^b$ indicate the two neighboring luma components in the vertical direction, $C_1$ indicates the first chroma component, $C_2$ indicates the second chroma component, $C_1^{tt}$ or Catt indicates the nearest chroma component in the top direction, $C_1^{bb}$ or $C_2^{bb}$ indicates the nearest chroma component in the bottom direction; and The luma interpolator 110 may, e.g., be configured to determine the second luma candidate value for the first position depending on:

$$Y_{h1} = (Y_1^l + Y_1^r + C_1)/2 - (C_1^{ll} + C_1^{rr})/4 \tag{b3}$$

wherein the luma interpolator 110 may, e.g., be configured to determine the second luma candidate value for the fourth position depending on:

$$Y_{h2} = (Y_2^l + Y_2^r + C_2)/2 - (C_2^{ll} + C_2^{rr})/4 \tag{b4}$$

wherein:

$Y_{h1}$ or $Y_{h2}$ indicates the second luma candidate value, $Y_1^l$, $Y_1^r$ or $Y_2^l$, $Y_2^r$ indicate the two neighboring luma components in the horizontal direction, $C_1^{ll}$ or $C_2^{ll}$ indicates the nearest chroma component in the left direction, $C_1^{rr}$ or $C_2^{rr}$ indicates the nearest chroma component in the right direction.

In an embodiment, the luma interpolator 110 may, e.g., be configured to select the luma component for the first position from the first luma candidate value $Y_{v1}$ for the first position and from the second luma candidate value $Y_{h1}$ for the first position by determining a first variance $V_{v1}$ for the first luma candidate value $Y_{v1}$ for the first position, by determining a second variance $V_{h1}$ for the second luma candidate value $Y_{h1}$ for the first position, and by selecting a luma candidate value from the first luma candidate value $Y_{v1}$ for the first position and from the second luma candidate value $Y_{h1}$ for the first position having a smaller variance than the other luma candidate value.

Moreover, the luma interpolator may, e.g., be configured to select the luma component for the fourth position from the first luma candidate value $Y_{v2}$ for the fourth position and from the second luma candidate value $Y_{h2}$ for the fourth position by determining a first variance $V_{v2}$ for the first luma candidate value $Y_{v2}$ for the fourth position, by determining a second variance $V_{h2}$ for the second luma candidate value $Y_{h2}$ for the fourth position, and by selecting a luma candidate value from the first luma candidate value $Y_{v2}$ for the fourth position and from the second luma candidate value $Y_{h2}$ for the fourth position having a smaller variance than the other luma candidate value.

According to an embodiment, the luma interpolator 110 may, e.g., be configured to determine the first variance for the first luma candidate value for the first position and the first variance for the first luma candidate value for the fourth position depending on:

$$V_{v1} = |Y_{v1} - Y_2^t| + |Y_{v1} - Y_2^b| \text{ and } V_{v2} = |Y_{v2} - Y_1^t| + |Y_{v2} - Y_1^b|; \tag{b5}$$

wherein $V_{v1}$ indicates the first variance for the first luma candidate value for the first position and $V_{v2}$ indicates the first variance for the first luma candidate value for the fourth position.

Moreover, the luma interpolator 110 may, e.g., be configured to determine the second variance for the second luma candidate value for the first position and the second variance for the second luma candidate value for the fourth position depending on:

$$V_{h1} = |Y_{h1} - Y_1^l| + |Y_{h1} - Y_1^r| \text{ and } V_{h2} = |Y_{h2} - Y_2^l| + |Y_{h2} - Y_2^r|, \tag{b6}$$

wherein $V_{h1}$ indicates the second variance for the second luma candidate value for the first position and $V_{h2}$ indicates the second variance for the second luma candidate value for the fourth position.

According to an embodiment, the luma interpolator may be configured to determine a first luma value at the position of the first chroma component by selecting from $Y_{v1}$ and $Y_{h1}$ the value whose variance $V_{v1}$ or $V_{h1}$ has the smaller value. According to an embodiment, the luma interpolator may be configured to determine a second luma value at the position of the second chroma component by selection from $Y_{v2}$ and $Y_{h2}$ the value whose corresponding variance $V_{v2}$ or $V_{h2}$ has the smaller value.

According to an embodiment, the alias canceller 120 may, e.g., be configured to determine a first updated chroma component for the first position for each of the plurality of 2×2 superpixels using the first chroma component at the first position, using the luma component that has been determined by the luma interpolator 110 for the first position, using two neighboring first luma components of the first position within the image and using two neighboring second luma components of the first position within the image. Furthermore, the alias canceller 120 may, e.g., be configured to determine a second updated chroma component for the fourth position for each of the plurality of 2×2 superpixels using the second chroma component at the fourth position, using the luma component that has been determined by the luma interpolator 110 for the fourth position, using two neighboring first luma components of the fourth position within the image and using two neighboring second luma components of the fourth position within the image.

In an embodiment, the alias canceller 120 may, e.g., be configured to determine the first updated chroma component for the first position for each of the plurality of 2×2 superpixels depending on $$C_1' = C_1 + \left[Y_2^t + Y_2^b + Y_1^l + Y_1^r\right)/4 - Y_1'\right] \times 2^{-w1} \tag{c1}$$

wherein $C_1'$ indicates the first updated chroma component, wherein $C_1$ indicates the first chroma component, wherein $Y_1'$ indicates the luma component that has been determined by the luma interpolator 110 for the first position;

wherein $Y_1^l$ and $Y_1^r$ indicate the two neighboring first luma components of the first position, wherein $Y_2^t$ and $Y_2^b$ indicate the two neighboring second luma components, of the first position, wherein w1 indicates a first weight being a first integer number.

The chrominance interpolator 130 may, e.g., be configured to determine the second updated chroma component for the fourth position for each of the plurality of 2×2 superpixels depending on $$C_2' = C_2 + \left[Y_1^t + Y_1^b + Y_2^l + Y_2^r\right)/4 - Y_2'\right] \times 2^{-w2} \tag{c2}$$

wherein $C_2'$ indicates the second updated chroma component, wherein $C_2$ indicates the second chroma component, wherein $Y_2'$ indicates the luma component that has been determined by the luma interpolator 110 for the fourth position;

wherein $Y_1^t$ and $Y_1^b$ indicate the two neighboring first luma components of the fourth position, wherein $Y_2^l$ and $Y_2^r$ indicate the two neighboring second luma components, of the fourth position, and wherein w2 indicates a second weight being a second integer number.

According to an embodiment, the chrominance interpolator 130 may, e.g., be configured to determine a first further updated chroma component for the first position for each of the plurality of 2×2 superpixels using the first updated chroma component of said first position and using neighboring first updated chroma components of said position within the image. Moreover, the chrominance interpolator 130 may, e.g., be configured to determine a second further updated chroma component for the fourth position for each of the plurality of 2×2 superpixels using the second updated chroma component of said fourth position and using neighboring second updated chroma components of said fourth position within the image.

In the following, chrominance interpolation according to particular embodiments is described:

In an embodiment, the chrominance interpolator 130 may, e.g., be configured to determine a first further updated chroma component for the first position depending on:

$$C_1'' = C_1'/2 + \left(C_1^{\prime ll} + C_1^{\prime rr} + C_1^{\prime tt} + C_1^{\prime bb}\right)/8 \tag{d1}$$

wherein $C_1''$ indicates the first further updated chroma component, wherein $C_1'$ indicates the first updated chroma component, wherein $C_1^{\prime ll}$, $C_1^{\prime rr}$, $C_1^{\prime tt}$ and $C_1^{\prime bb}$ indicate the neighboring first updated chroma components of said first position; and Moreover, the chrominance interpolator 130 may, e.g., be configured to determine a second further updated chroma component for the fourth position depending on:

$$C_2'' = C_2'/2 + \left(C_2^{\prime ll} + C_2^{\prime rr} + C_2^{\prime tt} + C_2^{\prime bb}\right)/8 \tag{d2}$$

wherein $C_2''$ indicates the second further updated chroma component, wherein $C_2'$ indicates the second updated chroma component, wherein $C_2^{\prime ll}$, $C_2^{\prime rr}$, $C_2^{\prime tt}$ and $C_2^{\prime bb}$ indicate the neighboring second updated chroma components of said fourth position.

In another embodiment, the chrominance interpolator 130 may, e.g., be configured to determine a first further updated chroma component for the first position depending on:

$$C_1'' = C_1'/2 + \left(C_1^{\prime lt} + C_1^{\prime rt} + C_1^{\prime lb} + C_1^{\prime rb}\right)/8 \tag{d3}$$

wherein $C_1''$ indicates the first further updated chroma component, wherein $C_1'$ indicates the first updated chroma component, wherein $C_1^{\prime lt}$, $C_1^{\prime rt}$, $C_1^{\prime lb}$ and $C_1^{\prime rb}$ indicate the neighboring first updated chroma components of said first position; and Moreover, in said other embodiment, the chrominance interpolator 130 may, e.g., be configured to determine a second further updated chroma component for the fourth position depending on:

$$C_2'' = C_2'/2 + \left(C_2^{\prime lt} + C_2^{\prime rt} + C_2^{\prime lb} + C_2^{\prime rb}\right)/8 \tag{d4}$$

wherein $C_2''$ indicates the second further updated chroma component, wherein $C_2'$ indicates the second updated chroma component, wherein $C_2^{\prime lt}$, $C_2^{\prime rt}$, $C_2^{\prime lb}$ and $C_2^{\prime rb}$ indicate the neighboring second updated chroma components of said fourth position.

According to an embodiment, the chrominance interpolator 130 may, e.g., be configured to determine the first chroma component for the second position and for the third position of each of the plurality of 2×2 superpixels depending on at least six first chroma components of the image. The chrominance interpolator 130 may, e.g., be configured to determine the second chroma component for the second position and for the third position of each of the plurality of 2×2 superpixels depending on at least six second chroma components of the image.

In an embodiment, each of the at least six first chroma components used for generating the first chroma component for the second position may, e.g., be located at a neighboring position of the second position, so that it can reach the second position by at most two steps in a vertical direction and at most two steps in a horizontal direction. Each of the at least six first chroma components used for generating the second chroma component for the second position may, e.g., be located at a neighboring position of the second position, so that it can reach the second position by at most two steps in a vertical direction and at most two steps in a horizontal direction. Each of the at least six first chroma components used for generating the first chroma component for the third position may, e.g., be located at a neighboring position of the third position, so that it can reach the third position by at most two steps in a vertical direction and at most two steps in a horizontal direction. Each of the at least six first chroma components used for generating the second chroma component for the third position may, e.g., be located at a neighboring position of the third position, so that it can reach the third position by at most two steps in a vertical direction and at most two steps in a horizontal direction.

In an embodiment, the chrominance interpolator 130 may, e.g., be configured to determine the first chroma component for the second position for each of the plurality of 2×2 superpixels depending on:

$$C_1'' = C_1'^{l}/4 + \left(C_1'^{ltt} + C_1'^{rtt} + C_1'^{lbb} + C_1'^{rbb}\right)/8; \tag{d5}$$

wherein $C_1''$ indicates the first chroma component for the second position, wherein $C_1'^{l}$, $C_1'^{r}$, $C_1'^{ltt}$, $C_1'^{rtt}$, $C_1'^{lbb}$, $C_1'^{rbb}$ indicate the at least six first updated chroma components used for generating the first chroma component for the second position.

Moreover, the chrominance interpolator 130 may, e.g., be configured to determine the first chroma component for the third position for each of the plurality of 2×2 superpixels depending on:

$$C_1'' = \left(C_1'^{t} + C_1'^{b}\right)/4 + \left(C_1'^{llt} + C_1'^{rrt} + C_1'^{llb} + C_1'^{rrb}\right)/8; \tag{d6}$$

wherein $C_1''$ indicates the first chroma component for the third position, wherein $C_1'^{t}$, $C_1'^{b}$, $C_1'^{llt}$, $C_1'^{rrt}$, $C_1'^{llb}$, $C_1'^{rrb}$ indicate the at least six first updated chroma components used for generating the first chroma component for the third position.

Furthermore, the chrominance interpolator 130 may, e.g., be configured to determine the second chroma component for the second position for each of the plurality of 2×2 superpixels depending on:

$$C_2'' = \left(C_2'^{t} + C_2'^{b}\right)/4 + \left(C_2'^{llt} + C_2'^{rrt} + C_2'^{llb} + C_2'^{rrb}\right)/8; \tag{d7}$$

wherein $C_2''$ indicates the second chroma component for the second position, wherein $C_2'^{t}$, $C_2'^{b}$, $C_2'^{llt}$, $C_2'^{rrt}$, $C_2'^{llb}$, $C_2'^{rrb}$ indicate the at least six second updated chroma components used for generating the second chroma component for the second position.

Moreover, the chrominance interpolator 130 may, e.g., be configured to determine the second chroma component for the third position for each of the plurality of 2×2 superpixels depending on:

$$C_2'' = \left(C_2'^{l} + C_2'^{r}\right)/4 + \left(C_2'^{ltt} + C_2'^{rtt} + C_2'^{lbb} + C_2'^{rbb}\right)/8; \tag{d8}$$

wherein $C_2''$ indicates the second chroma component for the third position, wherein $C_2'^{l}$, $C_2'^{r}$, $C_2'^{ltt}$, $C_2'^{rtt}$, $C_2'^{lbb}$, $C_2'^{rrb}$ indicate the at least six second updated chroma components used for generating the second chroma component for the third position.

According to an embodiment, after first chroma components have been generated by the chrominance interpolator 130 for the second position and for the third position for each of the plurality of 2×2 superpixels, the chrominance interpolator 130 may, e.g., be configured to determine the first chroma component for the fourth position for each of the plurality of 2×2 superpixels using the first chroma components generated for the second position and for the third position and using the first chroma component or an update of the first chroma component of the first position of the plurality of 2×2 superpixels.

After second chroma components have been generated by the chrominance interpolator 130 for the second position and for the third position for each of the plurality of 2×2 superpixels, the chrominance interpolator 130 may, e.g., be configured to determine the second chroma component for the first position for each of the plurality of 2×2 superpixels using the second chroma components generated for the second position and for the third position and using the second chroma component or an update of the second chroma component of the fourth position of the plurality of 2×2 superpixels.

In an embodiment, the chrominance interpolator 130 may, e.g., be configured to determine the first chroma component for the fourth position for each of the plurality of 2×2 superpixels depending on:

$$C_1'' = \left(C_1'^{lt} + C_1'^{rt} + C_1'^{lb} + C_1'^{rb}\right)/4 \tag{d9}$$

wherein $C_1''$ indicates the first chroma component for the fourth position, wherein $C_1'^{lt}$, $C_1'^{rt}$, $C_1'^{lb}$, $C_1'^{rb}$ indicate the four updated chroma components to the left top, right top, left bottom and right bottom of the fourth position.

In an embodiment, the chrominance interpolator 130 may, e.g., be configured to determine the second chroma component for the first position for each of the plurality of 2×2 superpixels depending on:

$$C_2'' = \left(C_2'^{lt} + C_2'^{rt} + C_2'^{lb} + C_2'^{rb}\right)/4 \tag{d10}$$

wherein $C_2''$ indicates the second chroma component for the first position, wherein $C_2'^{lt}$, $C_2'^{rt}$, $C_2'^{lb}$, $C_2'^{rb}$ indicate the four updated chroma components to the left top, right top, left bottom and right bottom of the first position.

In an embodiment, the component transformator 140 may, e.g., be configured to generate from the first chroma component, from the second chroma component and from the luma component of each position of each of the plurality of 2×2 superpixels a red sample value, a green sample value and a blue sample value for said position of the image to obtain an RGB image.

In an embodiment, the image information is obtained from encoded information, wherein the encoded information comprises an encoding of the image in an ISO/IEC 21122 encoding format.

According to an embodiment, the apparatus may, e.g., be configured to generate the at least three sample values for each of the plurality of 2×2 superpixels in parallel to generating CFA Bayer reconstruction of the image.

A median filter is not applied to simplify the design further.

Given that Y, $C_b$ and $C_r$ are now available at all sample positions, reconstructing a full resolution true-color image may, e.g., be conducted.

For example, at last step, the red, green and blue components are reconstructed from the first and second chroma component, and from the first and second luma component. Given that Y, $C_1$ and $C_2$ are now available at all sample positions, according to an embodiment, the component transformator 140 may, e.g., be configured to generate the red sample value, the green sample value and the blue sample value for said position of the image depending on:

$$G = Y - (2^{w2} \times C_2 + 2^{w1} \times C_1)/4$$

$$R = C_1 + G$$

$$B = C_2 + G$$

$$\text{(e.g., if } C_1 = \text{Cr and if } C_2 = \text{Cb)},$$

or depending on:

$$G = Y - (2^{w1} \times C_1 + 2^{w2} \times C_2)/4$$

$$R = C_2 + G$$

$$B = C_1 + G$$

$$\text{(e.g., if } C_1 = \text{Cb and if } C_2 = \text{Cr)};$$

wherein G indicates the green sample,
wherein R indicates the red sample,
wherein B indicates the blue sample,
wherein $C_1$ indicates the first chroma component,
wherein $C_2$ indicates the second chroma component,
wherein Y indicates the luma component,
wherein w1 indicates a first weight being a first integer, for example 0≤w1≤3,
wherein w2 indicates a second weight being a second integer for example 0≤w2≤3.

Considering the above, the filters (b1) and (b2) pass the 0-frequency for luma (e.g., are low-pass for luma), but cancel the 0-frequency for the chroma-difference as they should (i.e. are high-pass for chroma difference). They use all powers-of-two as weights to allow an implementation that operates entirely with adds and shifts reducing hardware complexity. The filters (c1) to (c3) and (d1) to (d16) are designed in a similar mindset, using only powers of two as weights, easing hardware implementation.

It is advantageous that this reconstruction filter does not work on the reconstructed CFA Bayer pattern, but on the intermediate output of the JPEG XS reconstruction process and thus saves complexity.

The Y reconstruction process, e.g., as defined by equations (b1) and (b2) may, e.g., be considered as an improvement of [19], though applied to luma and chroma-difference values. In [19], it is applied to green and blue or red.

The alias cancelation (c1 to c3) provides a further improvement. The Cb/Cr interpolation filter (d1) to (d16) provides further improvements. It may, e.g., be implemented as a low-pass interpolation filter, but other filters might be applied as well. The filter provided here is a minimal complexity filter that goes beyond nearest neighbour bilinear interpolation.

In the following, further details of the improved JPEG XS CFA Bayer reconstruction process according to embodiments are provided.

Figure 2:
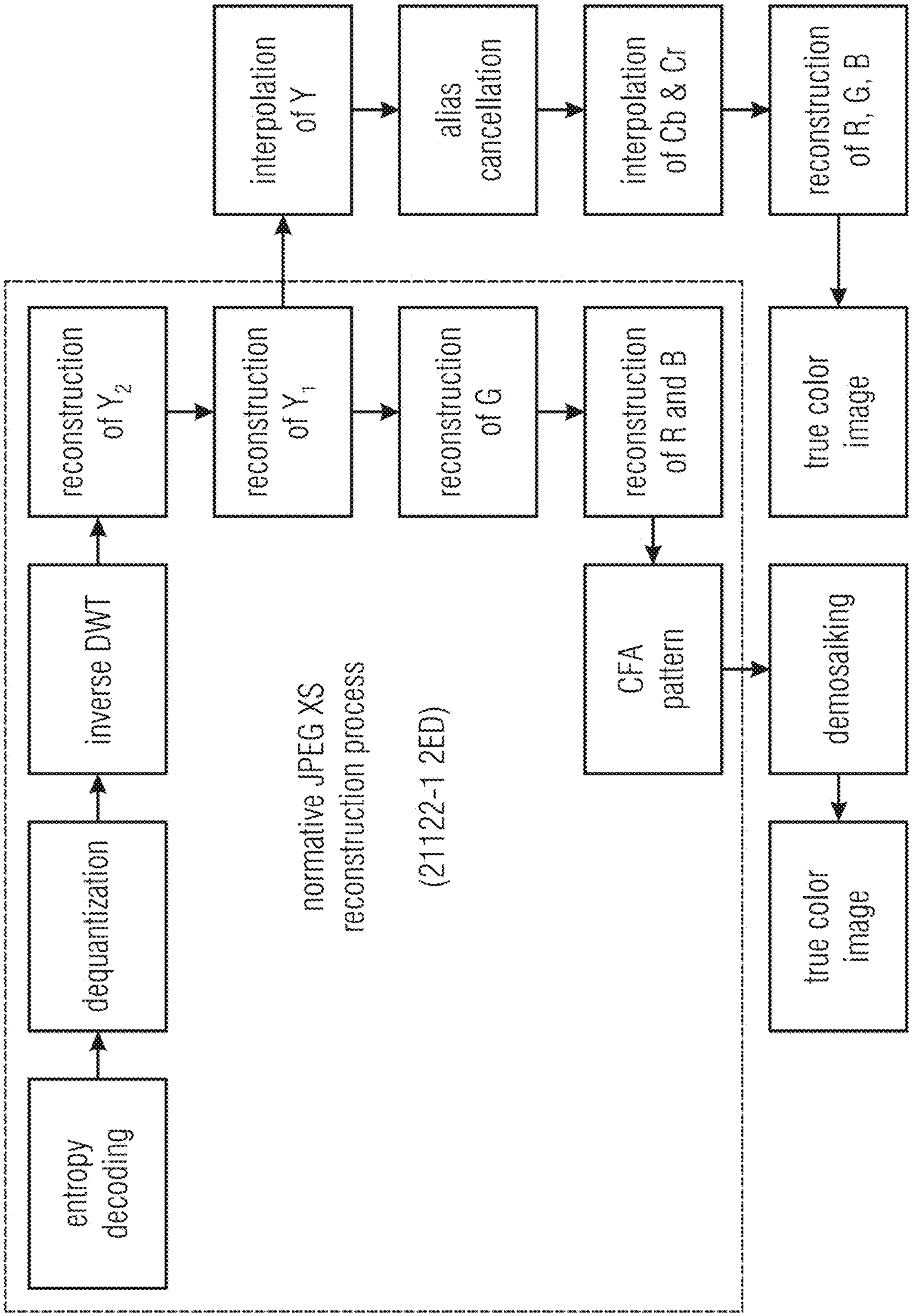
FIG. 2 illustrates improved demosaicking with JPEG XS according to an embodiment.

FIG. 2 illustrates improved demosaicking with JPEG XS according to an embodiment. In particular, FIG. 2 describes the relation of embodiments relative to the standard JPEG XS reconstruction process, which is contained in the blue left-top box and described in previous section. The standard defined reconstruction process starts at entropy decoding, dequantization, an inverse wavelet decomposition and the reconstruction of the CFA Bayer pattern. In a conventional workflow, this CFA Bayer pattern is input to a demosaicking algorithm (bottom middle) such as bilinear interpolation or the AHD algorithm [19] or the algorithm from [2]. This demosaicking is not defined by the JPEG XS standard and is thus outside of the blue box in FIG. 1.

Embodiments aim to interrupt the regular reconstruction workflow of the JPEG XS decoding pipeline and replace the remaining steps to not only improve the image quality, but also reduce the overall complexity. Embodiments leave the first three steps of the reconstruction procedure untouched (e.g., sample rearrangement and equations (a2) and (a3)) and recover a true-color picture directly from the $Y_1$, $Y_2$, $C_1$, $C_2$ components—see right hand side of FIG. 2.

Thus, embodiments replace the bilinear interpolation of Y and $C_1$, $C_2$ by filters that cancel to a major degree the encoder-side aliasing.

As baseline, embodiments are also compared to the bilinear filter, applying filtering in the Y, $C_b$, $C_r$ domain instead of the image domain.

The JPEG XS decoder has been equipped with the demosaiking algorithm of embodiments using a directional filter, and once more using bi-linear interpolation of the Y component.

For each of the reconstruction methods, the PSNR to the original (full resolution) RGB image is computed as function of the bitrate.

Figure 3:
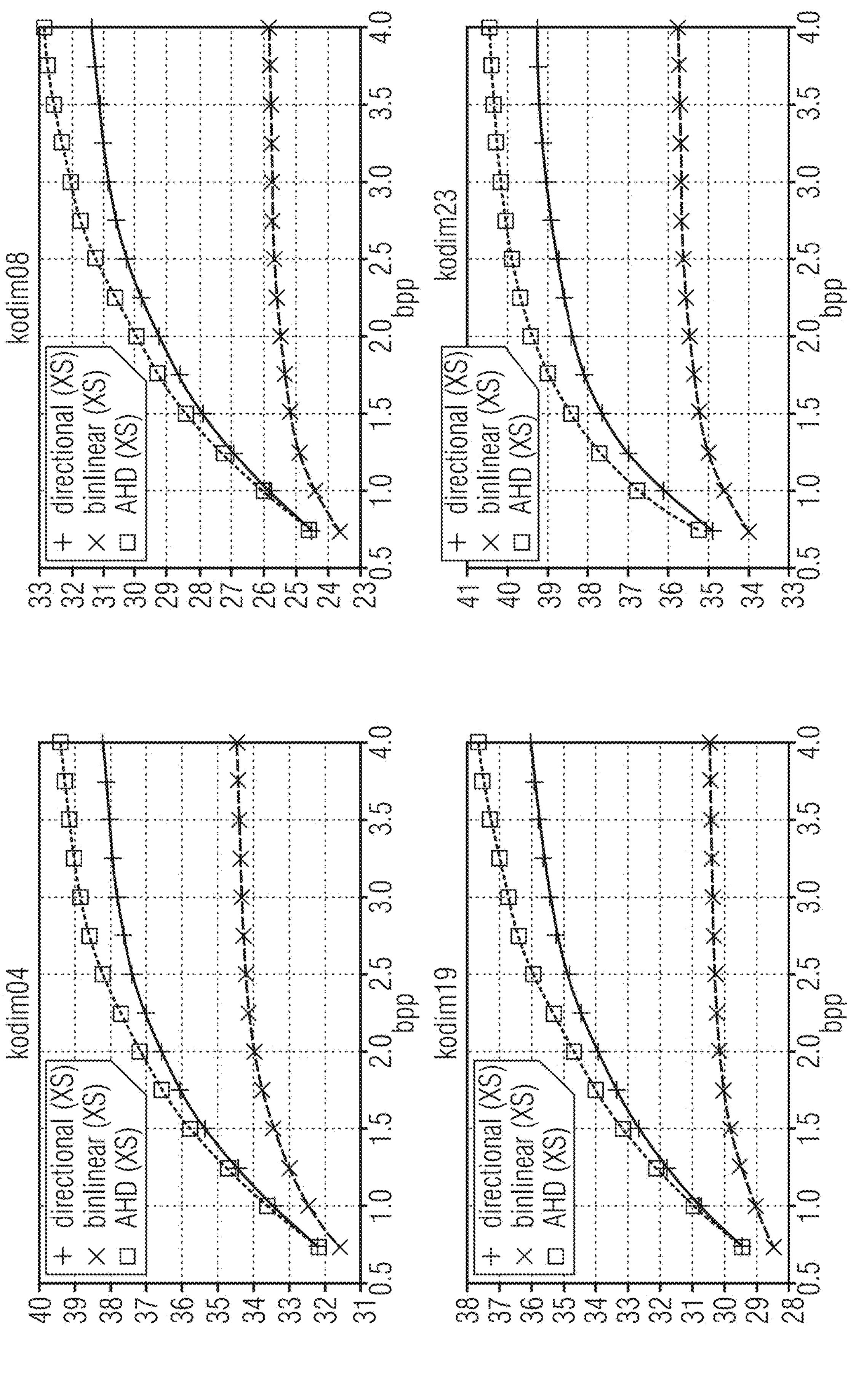
FIG. 3 plots the PSNR of the reconstructed images relative to the uncompressed 24 bit RGB original for two images.

FIG. 3 plots the PSNR of the reconstructed images relative to the uncompressed 24 bit RGB original for two images.

Figure 4:
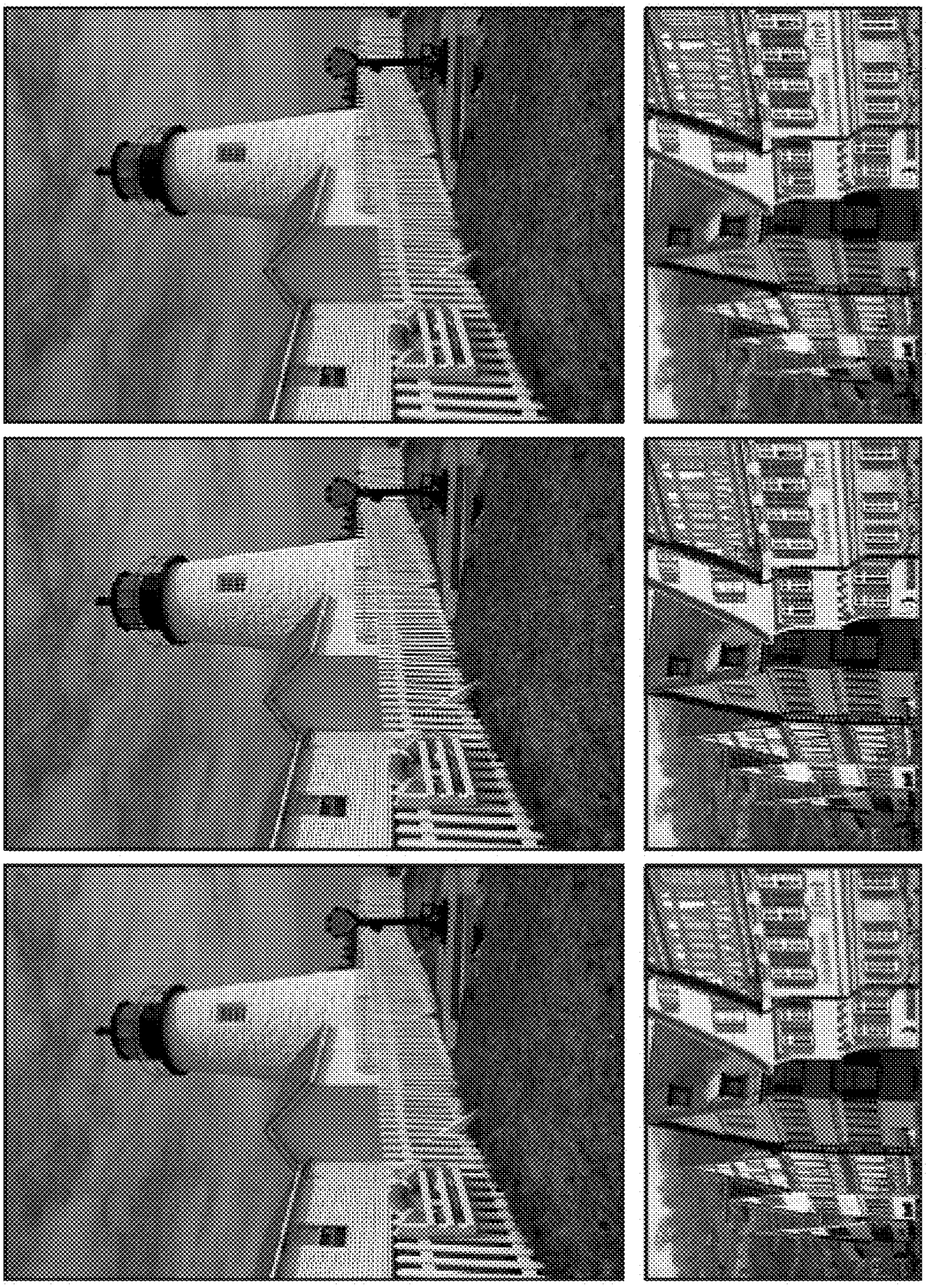
FIG. 4 illustrates some compression results for the images, whose quality is plotted in FIG. 3, all at 3 bits per pixel, using all three discussed demosaiking algorithms, namely bilinear interpolation, AHD, and the inventive algorithm of embodiments.

FIG. 4 illustrates some compression results for the images, whose quality is plotted in FIG. 3, here all at 3 bits per pixel, using all three discussed demosaiking algorithms. In particular, FIG. 4 illustrates image crops from demosaiced images, all at 3 bpp, top row from the Kodak 19 image, bottom row from the Kodak 08 image. Left column is bilinear interpolation, middle column is the algorithm of an embodiment, right column is the AHD algorithm.

TABLE 1

| Algorithm | Add | Shift | Mult | Functions |
|---|---|---|---|---|
| Bilinear | 4 | 2 | | |
| AHD | 538 | 312 | 306 | 126 |
| Ours | 25 | 8 | | |
| Avoided | 3 | 2 | | |

Table 1 illustrates an average number of operations per pixel for the discussed demosaiking algorithms. The rightmost column lists power and square root functions required by the AHD algorithm (see [19]) which can be realized by table lookups. The bottommost row is the number of operations per pixel that can be avoided by not performing all four CFA reconstruction algorithm lifting steps but only the first two. In particular, Table 2 lists the average number of operations required per pixel to reconstruct an image from a CFA Bayer pattern to the RGB domain. It should be noted that the proposed algorithm does not take a CFA Bayer pattern as input, but the four components that are output of the JPEG XS inverse wavelet steps. If these samples would be reconstructed to an RGB image, all four lifting steps of the Star-Tetrix transformation introduced above would have to be inverted, though the proposed algorithm only requires the inversion of the last two steps, generating complexity savings indicated in the last row of table 2.

It is both observable from the PSNR measurements in FIG. 3 and the image crops in FIG. 4 that the method of an embodiment improves image quality considerably over bilinear interpolation, but is also less powerful than the more complex AHD algorithm [4]. The proposed algorithm can notably reduce zipper defects compared to bilinear interpolation and is in this regard of similar performance than the AHD algorithm, though is not able to remove aliasing in the chroma channels completely, as seen in the Kodak 19 image (top row) of FIG. 4. However, the simplicity of the discussed algorithm achieves an approximately 30 fold complexity reduction compared to the state of the art, while being approximately 4 times as complex as bilinear interpolation.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

A further embodiment would be in a digital camera, capturing light with a CFA Bayer sensor, compressing the resulting sensor information with ISO/IEC 21122 (JPEG XS) and generating a preview image from the stream generated by the camera.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Although each claim only refers back to one single claim, the disclosure also covers any conceivable combination of claims.

REFERENCES

[1] Soo-Chang Pei, lo-Kuong Tam: "Effective color interpolation in CCD color filter array using signal correlation," Proceedings 2000 International Conference on Image Processing (Cat. No. 00CH37101), Vancouver, BC, Canada, 2000, pp. 488-491 vol. 3, doi: 10.1109/ICIP.2000.899455.

[2] Soo-Chang Pei and lo-Kuong Tam: "Effective color interpolation in CCD color filter arrays using signal correlation," in IEEE Transactions on Circuits and Systems for Video Technology, vol. 13, no. 6, pp. 503-513, June 2003, doi: 10.1109/TCSVT.2003.813422.

[3] H. S. Malvar, Li-wei He, R. Cutler: "High-quality linear interpolation for demosaicing of Bayer-patterned color images," 2004 IEEE International Conference on Acoustics, Speech, and Signal Processing, Montreal, QC, Canada, 2004, pp. iii-485, doi: 10.1109/ICASSP.2004.1326587.

[4] K. Hirakawa and T. W. Parks: "Adaptive homogeneity-directed demosaicing algorithm," in IEEE Transactions on Image Processing, vol. 14, no. 3, pp. 360-369, March 2005, doi: 10.1109/TIP.2004.838691.

[5] I. Pekkucuksen, Y. Altunbasak: "Gradient based threshold free color filter array interpolation," 2010 IEEE International Conference on Image Processing, Hong Kong, China, 2010, pp. 137-140, doi: 10.1109/ICIP.2010.5654327.

[6] I. Pekkucuksen, Y. Altunbasak: "Edge oriented directional Color Filter Array interpolation," 2011 IEEE International Conference on Acoustics, Speech and Signal Processing (ICASSP), Prague, Czech Republic, 2011, pp. 993-996, doi: 10.1109/ICASSP.2011.5946573.

[7] I. Pekkucuksen, Y. Altunbasak: "Edge Strength Filter Based Color Filter Array Interpolation," in IEEE Transactions on Image Processing, vol. 21, no. 1, pp. 393-397, January 2012, doi: 10.1109/TIP.2011.2155073.

[8] Y. Monno, D. Kiku, M. Tanaka, M. Okutomi: "Adaptive residual interpolation for color image demosaicking," 2015 IEEE International Conference on Image Processing (ICIP), Quebec City, QC, Canada, 2015, pp. 3861-3865, doi: 10.1109/ICIP.2015.7351528.

[9] H. S. Malvar, G. J. Sullivan: "Progressive-to-Lossless Compression of Color-Filter-Array Images using Macropixel Spectral-Spatial Transformation", Proc. of Data Compression Conf. 2012 (DCC), 2012.

[10] T. Suzuki: "Lossless compression of CFA-sampled images using YDgCoCg transforms with CDF wavelets", Proc. of Intl. Conf. on Image Proc. (ICIP), 2018.

[11] B. E. Bayer: "Color imaging array", U.S. Pat. No. 3,971,065, (1976).

[12] T. Richter S. Foßel: "Bayer Pattern Compression with JPEG XS," 2019 IEEE International Conference on Image Processing (ICIP), Taipei, Taiwan, 2019, pp. 3177-3181, doi: 10.1109/ICIP.2019.8803376.

[13] T. Richter, S. Foßel, A. Descampe, G. Rouvroy: "Bayer CFA Pattern Compression With JPEG XS," in IEEE Transactions on Image Processing, vol. 30, pp. 6557-6569, 2021, doi: 10.1109/TIP.2021.3095421.

[14] Th. Richter, J. Keinert, A. Descampe, G. Rouvroy: "Entropy Coding and Entropy Coding Improvements of JPEG XS", Proc. of Data Compression Conf. 2018 (DCC), 2018.

[15] D. Coffin: "dcraw, Decoding raw digital photos in Linux" available online at http://www.dechifro.org/dcraw/, retrieved July 2024.

[16] A. Descampe, Th. Richter, T. Ebrahimi, S. Föβel, J. Keinert, T. Bruylants, P. Pellegrin, Ch. Buysschaert. G. Rouvroy: "JPEG XS—A New Standard for Visually Lossless Low-Latency Lightweight Image Coding," in Proceedings of the IEEE, vol. 109, no. 9, pp. 1559-1577 September 2021, doi: 10.1109/JPROC.2021.3080916.

[17] Th. Richter, J. Keinert, S. Foßel, A. Descampe, G. Rouvroy, J. B. Lorent: "JPEG-XS, A high quality mezzanine image codec for video over IP", SMPTE Motion Imaging Journal, (October 2018).

[18] A. Descampe, J. Keinert, Th. Richter, S. Föβel, G. Rouvroy: "JPEG XS: a new standard for visually lossless low-latency lightweight image compression", Appl. of Digital Image Proc. XL (Proc. of SPIE Optics+Photonics), (2017).

[19] Th. Richter, T. Bruylands: "Information technology—JPEG XS low-latency lightweight image coding system, Part 1: Core coding system", published as ISO/IEC 21122-1, (2022).

[20] Richter T., Minuth C., U.S. Pat. No. 12,063,391 B2, date of patent: Aug. 13, 2024.

The invention claimed is:

1. An apparatus for reconstructing an image from image information comprising a plurality of 2×2 superpixels of the image, wherein each of the plurality of 2×2 superpixels comprises one first chroma component at a first position of the 2×2 superpixels, one first luma component at a second position of the 2×2 superpixels, one second luma component at a third position of the 2×2 superpixels, and one second chroma component at a fourth position of the 2×2 superpixels, wherein the apparatus comprises circuitry configured to function as:

a luma interpolator configured for determining a luma component for each of the first position and the fourth position of each of the plurality of 2×2 superpixels depending on luma components at respective neighboring positions of the first position and the fourth position within the image, depending on a respective chroma component at the first and the fourth position, and depending on chroma components at respective neighboring positions of the first position and the fourth position within the image;

an alias canceller configured for conducting alias cancellation by determining a first updated chroma component for the first position for each of the plurality of 2×2 superpixels depending on the first chroma component at the first position, depending on the luma component at the first position determined by the luma interpolator, and depending on luma components at neighboring positions of the first position within the image; and determining a second updated chroma component for the fourth position for each of the plurality of 2×2 superpixels depending on the second chroma component at the fourth position, depending on the luma component at the fourth position determined by the luma interpolator, and depending on luma components at neighboring positions of the fourth position within the image;

a chrominance interpolator configured for determining a first chroma component for each of the second position, the third position and the fourth position of each of the plurality of 2×2 superpixels depending on first updated chroma components at respective neighboring positions of the second position, the third position, and the fourth position within the image; and determining a second chroma component for each of the first position, the second position and the third position of each of the plurality of 2×2 superpixels depending on second updated chroma components at respective neighboring positions of the first position, the second position and the third position within the image; and a component transformator configured for generating, from the first chroma component or from the first updated chroma component, from the second chroma component or from the second updated chroma component, and from a luma component of each position of each of the plurality of 2×2 superpixels, at least three sample values for each position of each of the plurality of 2×2 superpixels.

2. An apparatus according to claim 1, wherein the luma interpolator is configured to determine the luma component for the first position of each of the plurality of 2×2 superpixels by determining a first luma candidate value for the first position depending on two luma components at neighboring positions in a vertical direction from the first position within the image, depending on the first chroma component at the first position, and depending on two further chroma components located in the vertical direction within the image from the first position;

determining a second luma candidate value for the first position depending on two luma components at neighboring positions in a horizontal direction from the first position within the image depending on the first chroma component at the first position and depending on two further chroma components located in the horizontal direction within the image from the first position; and selecting the luma component for the first position from the first luma candidate value for the first position and the second luma candidate value for the first position depending on a selection criterion;

wherein the luma interpolator is configured to determine the luma component for the fourth position of each of the plurality of 2×2 superpixels by determining a first luma candidate value for the fourth position depending on two luma components at neighboring positions in a vertical direction from the fourth position within the image, depending on the second chroma component at the fourth position, and depending on two further chroma components located in the vertical direction within the image from the fourth position, determining a second luma candidate value for the fourth position depending on two luma components at neighboring positions in a horizontal direction from the fourth position within the image, depending on the second chroma component at the fourth position, and depending on two further chroma components located in the horizontal direction within the image from the fourth position; and selecting the luma component for the fourth position from the first luma candidate value for the fourth position and the second luma candidate value for the fourth position depending on a selection criterion.

3. An apparatus according to claim 2, wherein, for each of the first position and the fourth position, the luma interpolator is configured to select the luma component from the first luma candidate value and the second luma candidate value by determining a first variance for the first luma candidate value, determining a second variance for the second luma candidate value, and selecting a luma candidate value from the first luma candidate value and from the second luma candidate value having a smaller variance than the other luma candidate value.

4. An apparatus according to claim 3, wherein, for each of the first position and the fourth position, the luma interpolator is configured to determine the first variance depending on the first luma candidate value and depending on the two neighboring luma components in the vertical direction, and determine the second variance depending on the second luma candidate value and depending on the two neighboring luma components in the horizontal direction.

5. An apparatus according to claim 1, wherein a position is considered to be a neighboring position of another position, if the position can be reached from the other position by at most two steps in a vertical direction and at most two steps in a horizontal direction.

6. An apparatus according to claim 2, wherein the two further chroma components located in the vertical direction are a nearest chroma component in a top direction from the first or fourth position and a nearest chroma component in a bottom direction from the first or fourth position, and wherein the two further chroma components located in the horizontal direction are a nearest chroma component in a left direction from the first or fourth position and a nearest chroma component in a right direction from the first or fourth position.

7. An apparatus according to claim 6, wherein the luma interpolator is configured to determine the first luma candidate value for the first position depending on:

$$Y_{v1}=(Y_2^t+Y_2^b+C_1)/2-(C_1^{tt}+C_1^{bb})/4;$$

wherein the luma interpolator is configured to determine the first luma candidate value for the fourth position depending on:

$$Y_{v2}=(Y_1^t+Y_1^b+C_2)/2-(C_2^{tt}+C_2^{bb})/4;$$

wherein:

$Y_{v1}$ or $Y_{v2}$ indicates the first luma candidate value, $Y_2^t$, $Y_2^b$ or $Y_1^t$, $Y_1^b$ indicate the two neighboring luma components in the vertical direction, $C_1$ indicates the first chroma component, $C_2$ indicates the second chroma component, $C_1^{tt}$ or $C_2^{tt}$ indicates the nearest chroma component in the top direction, and $C_1^{bb}$ or $C_2^{bb}$ indicates the nearest chroma component in the bottom direction;

wherein the luma interpolator is configured to determine the second luma candidate value for the first position depending on:

$$Y_{h1}=(Y_1^l+Y_1^r+C1)/2-(C_1^{ll}+C_1^{rr})/4;$$

wherein the luma interpolator is configured to determine the second luma candidate value for the fourth position depending on:

$$Y_{h2}=(Y_2^l+Y_2^r+C2)/2-(C_2^{ll}+C_2^{rr})/4; \text{ and}$$

wherein:

$Y_{h1}$ or $Y_{h2}$ indicates the second luma candidate value, $Y_1^l$, $Y_1^r$ or $Y_2^l$, $Y_2^r$ indicate the two neighboring luma components in the horizontal direction, $C_1^{ll}$ or $C_2^{ll}$ indicates the nearest chroma component in the left direction, and $C_1^{rr}$ or $C_2^{rr}$ indicates the nearest chroma component in the right direction.

8. An apparatus according to claim 7, wherein the luma interpolator is configured to select the luma component for the first position from the first luma candidate value for the first position and from the second luma candidate value for the first position by determining a first variance for the first luma candidate value for the first position, determining a second variance for the second luma candidate value for the first position, and selecting a luma candidate value from the first luma candidate value for the first position and from the second luma candidate value for the first position having a smaller variance than the other luma candidate value;

wherein the luma interpolator is configured to select the luma component for the fourth position from the first luma candidate value for the fourth position and from the second luma candidate value for the fourth position by determining a first variance for the first luma candidate value for the fourth position, determining a second variance for the second luma candidate value for the fourth position, and selecting a luma candidate value from the first luma candidate value for the fourth position and from the second luma candidate value for the fourth position having a smaller variance than the other luma candidate value.

9. An apparatus according to claim 8, wherein the luma interpolator is configured to determine the first variance for the first luma candidate value for the first position and the first variance for the first luma candidate value for the fourth position depending on:

$$V_{v1}=|Y_{v1}-Y_2^t|+|Y_{v1}-Y_2^b| \text{ and } V_{v2}=|Y_{v2}-Y_1^t|+|Y_{v2}-Y_1^b|;$$

wherein $V_{v1}$ indicates the first variance for the first luma candidate value for the first position, and $V_{v2}$ indicates the first variance for the first luma candidate value for the fourth position;

wherein the luma interpolator is configured to determine the second variance for the second luma candidate value for the first position and the second variance for the second luma candidate value for the fourth position depending on:

$$V_{h1}=|Y_{h1}-Y_1^l|+|Y_{h1}-Y_1^r| \text{ and } V_{h2}-|Y_{h2}-Y_2^l|+|Y_{h2}-Y_2^r|; \text{ and}$$

wherein Vh1 indicates the second variance for the second luma candidate value for the first position, and $V_{h2}$ indicates the second variance for the second luma candidate value for the fourth position.

10. An apparatus according to claim 1, wherein the alias canceller is configured to determine a first updated chroma component for the first position for each of the plurality of 2×2 superpixels using the first chroma component at the first position, using the luma component determined by the luma interpolator for the first position, using two neighboring first luma components of the first position within the image, and using two neighboring second luma components of the first position within the image; and determine a second updated chroma component for the fourth position for each of the plurality of 2×2 superpixels using the second chroma component at the fourth position, using the luma component determined by the luma interpolator for the fourth position, using two neighboring first luma components of the fourth position within the image, and using two neighboring second luma components of the fourth position within the image.

11. An apparatus according to claim 10, wherein the alias canceller is configured to determine the first updated chroma component for the first position for each of the plurality of 2×2 superpixels depending on $$C_1'=C_1+[(Y_2^t+Y_2^b+Y_1^l+Y_1^r)/4-Y_1']\times 2^{-w1};$$

wherein;

$C_1'$ indicates the first updated chroma component, $C_1$ indicates the first chroma component, Y1' indicates the luma component that has been determined by the luma interpolator for the first position, $Y_1^l$ and $Y_1^r$ indicate the two neighboring first luma components of the first position, $Y_2^t$ and $Y_2^b$ indicate the two neighboring second luma components, of the first position, and w1 indicates a first weight being a first integer number;

wherein the alias canceller is configured to determine the second updated chroma component for the fourth position for each of the plurality of 2×2 superpixels depending on $$C_2'=C_2+[(Y_1^t+Y_1^b+Y_2^l+Y_2^r)/4-Y_2']\times 2^{-w1}; \text{ and}$$

wherein:

$C_2'$ indicates the second updated chroma component, $C_2$ indicates the second chroma component, $Y_2'$ indicates the luma component that has been determined by the luma interpolator for the fourth position, $Y_1^t$ and $Y_1^b$ indicate the two neighboring first luma components of the fourth position, $Y_2^l$ and $Y_2^r$ indicate the two neighboring second luma components, of the fourth position, and w2 indicates a second weight being a second integer number.

12. An apparatus according to claim 10, wherein the chrominance interpolator is configured to determine a first further updated chroma component for the first position for each of the plurality of 2×2 superpixels using the first updated chroma component of the first position and using neighboring first updated chroma components of the first position within the image, and determine a second further updated chroma component for the fourth position for each of the plurality of 2×2 superpixels using the second updated chroma component of the fourth position and using neighboring second updated chroma components of the fourth position within the image.

13. An apparatus according to claim 12, wherein the chrominance interpolator is configured to determine a first further updated chroma component for the first position depending on:

$$C_1''=C_1'/2+(C_1'^{ll}+C_1'^{rr}+C_1'^{tt}+C_1'^{bb})/8;$$

wherein;

$C_1''$ indicates the first further updated chroma component, $C_1'$ indicates the first updated chroma component, and $C_1'^{ll}$, $C_1'^{rr}$, $C_1'^{tt}$ and $C_1'^{bb}$ indicate the neighboring first updated chroma components of the first position;

wherein the chrominance interpolator is configured to determine a second further updated chroma component for the fourth position depending on:

$$C_2''=C_2'/2+(C_2'^{ll}+C_2'^{rr}+C_2'^{tt}+C_2'^{bb})/8; \text{ and}$$

wherein:

$C_2''$ indicates the second further updated chroma component, $C_2'$ indicates the second updated chroma component, and $C_2'^{ll}$, $C_2'^{rr}$, $C_2'^{tt}$ and $C_2'^{bb}$ indicate the neighboring second updated chroma components of the fourth position.

14. An apparatus according to claim 12, wherein the chrominance interpolator is configured to determine a first further updated chroma component for the first position depending on:

$$C_1''=C_1'/2+(C_1'^{lt}+C_1'^{rt}+C_1'^{lb}+C_1'^{rb})/8;$$

wherein:

$C_1''$ indicates the first further updated chroma component, $C_1'$ indicates the first updated chroma component, $C_1'^{lt}$, $C_1'^{rt}$, $C_1'^{lb}$ and $C_1'^{rb}$ indicate the neighboring first updated chroma components of the first position; and wherein the chrominance interpolator is configured to determine a second further updated chroma component for the fourth position depending on:

$$C_2''=C_2'/2+(C_2'^{lt}+C_2'^{rt}+C_2'^{lb}+C_2'^{rb})/8; \text{ and}$$

wherein;

$C_2''$ indicates the second further updated chroma component, $C_2'$ indicates the second updated chroma component, and $C_2'^{lt}$, $C_2'^{rt}$, $C_2'^{lb}$ and $C_2'^{rb}$ indicate the neighboring second updated chroma components of the fourth position.

15. An apparatus according to claim 1, wherein the chrominance interpolator is configured to determine the first chroma component for the second position and for the third position of each of the plurality of 2×2 superpixels depending on at least six first chroma components of the image, and determine the second chroma component for the second position and for the third position of each of the plurality of 2×2 superpixels depending on at least six second chroma components of the image.

16. An apparatus according to claim 15, wherein each of the at least six first chroma components used for generating the first chroma component for the second position is located at a respective neighboring position of the second position and the second position reaches each respective neighboring position of the second position by at most two steps in a vertical direction and at most two steps in a horizontal direction;

wherein each of the at least six first chroma components used for generating the second chroma component for the second position is located at a respective neighboring position of the second position and the second position reaches each respective neighboring position of the second position by at most two steps in a vertical direction and at most two steps in a horizontal direction;

wherein each of the at least six first chroma components used for generating the first chroma component for the third position is located at a respective neighboring position of the third position and the third position reaches each respective neighboring position of the third position by at most two steps in a vertical direction and at most two steps in a horizontal direction; and wherein each of the at least six first chroma components used for generating the second chroma component for the third position is located at a respective neighboring position of the third position and the third position reaches each respective neighboring position of the third position by at most two steps in a vertical direction and at most two steps in a horizontal direction.

17. An apparatus according to claim 10, wherein the chrominance interpolator is configured to determine the first chroma component for the second position of each of the plurality of 2×2 superpixels using at least six first updated chroma components of the image, wherein each of the at least six first updated chroma components is located at a respective neighboring position of the second position and the second position reaches each respective neighboring position of the second position by at most two steps in a vertical direction and at most two steps in a horizontal direction;

determine the second chroma component for the second position of each of the plurality of 2×2 superpixels using at least six first updated chroma components of the image, wherein each of the at least six first updated chroma components is located at a respective neighboring position of the second position and the second position reaches each respective neighboring position of the second position by at most two steps in a vertical direction and at most two steps in a horizontal direction;

determine the first chroma component for the third position of each of the plurality of 2×2 superpixels using at least six first updated chroma components of the image, wherein each of the at least six first updated chroma components is located at a respective neighboring position of the third position and the third position reaches each respective neighboring position of the third position by at most two steps in a vertical direction and at most two steps in a horizontal direction; and determine the second chroma component for the third position of each of the plurality of 2×2 superpixels using at least six first updated chroma components of the image, wherein each of the at least six first updated chroma components is located at a respective neighboring position of the third position and the third position reaches each respective neighboring position of the third position by at most two steps in a vertical direction and at most two steps in a horizontal direction.

18. An apparatus according to claim 17, wherein the chrominance interpolator is configured to determine the first chroma component for the second position for each of the plurality of 2×2 superpixels depending on:

$$C_1''=(C_1'^{l}+C_1'^{r})/4+(C_1'^{ltt}+C_1+^{rtt}+C_1'^{lbb}+C_1'^{rbb})/8;$$

wherein:

$C_1''$ indicates the first chroma component for the second position, and $C_1'_{l}$, $C_1'^{r}$, $C_1'^{ltt}$, $C_1'^{rtt}$, $C_1'^{lbb}$, $C_1'^{rbb}$ indicate the at least six first updated chroma components used for generating the first chroma component for the second position;

wherein the chrominance interpolator is configured to determine the first chroma component for the third position for each of the plurality of 2×2 superpixels depending on:

$$C_1''=(C_1'^{t}+C_1'^{b})/4+(C_1'^{ltt}+C_1'^{rtt}+C_1'^{lbb}+C_1'^{rbb})/8;$$

wherein:

$C_1''$ indicates the first chroma component for the third position, and wherein $C_1'^{t}$, $C_1'^{b}$, $C_1'^{ltt}$, $C_1'^{rtt}$, $C_1'^{lbb}$, $C_1'^{rbb}$ indicate the at least six first updated chroma components used for generating the first chroma component for the third position;

wherein the chrominance interpolator is configured to determine the second chroma component for the second position for each of the plurality of 2×2 superpixels depending on:

$$C_2''=(C_2'^{t}+C_2'^{b})/4+(C_2'^{llt}+C_2'^{rtt}+C_2'^{llb}+C_2'^{rrb})/8;$$

wherein:

$C_2''$ indicates the second chroma component for the second position, and $C_2'^{t}$, $C_2'^{b}$, $C_2'^{llt}$, $C_2'^{rrt}$, $C_2'^{llb}$, $C_2'^{rrb}$ indicate the at least six second updated chroma components used for generating the second chroma component for the second position;

wherein the chrominance interpolator is configured to determine the second chroma component for the third position for each of the plurality of 2×2 superpixels depending on:

$$C_2''=(C_2'^{l}+C_2'^{r})/4+(C_2'^{ltt}+C_2'^{rtt}+C_2'^{lbb}+C_2'^{rbb})/8; \text{ and}$$

herein:

$C_2''$ indicates the second chroma component for the third position, and $C_2'_{l}$, $C_2'^{r}$, $C_2'^{ltt}$, $C_2'^{rtt}$, $C_2'^{lbb}$, $C_2'^{rbb}$ indicate the at least six second updated chroma components used for generating the second chroma component for the third position.

19. An apparatus according to claim 1, wherein, after first chroma components have been generated by the chrominance interpolator for the second position and for the third position for each of the plurality of 2×2 superpixels, the chrominance interpolator is configured to determine the first chroma component for the fourth position for each of the plurality of 2×2 superpixels using the first chroma components generated for the second position and for the third position and using the first chroma component or an update of the first chroma component of the first position of the plurality of 2×2 superpixels; and wherein, after second chroma components have been generated by the chrominance interpolator for the second position and for the third position for each of the plurality of 2×2 superpixels, the chrominance interpolator is configured to determine the second chroma component for the first position for each of the plurality of 2×2 superpixels using the second chroma components generated for the second position and for the third position and using the second chroma component or an update of the second chroma component of the fourth position of the plurality of 2×2 superpixels.

20. An apparatus according to claim 1, wherein the chrominance interpolator is configured to determine the first chroma component for the fourth position for each of the plurality of 2×2 superpixels depending on:

$$C_1''=(C_1'^{lt}+C_1'^{rt}+C_1'^{lb}+C_1'^{rb})/4;$$

wherein:

$C_1''$ indicates the first chroma component for the fourth position, and $C_1'^{lt}$, $C_1'^{rt}$, $C_2'^{lb}$, $C_2'^{rb}$ indicate the four updated chroma components to the left top, right top, left bottom and right bottom of the fourth position;

wherein the chrominance interpolator is configured to determine the second chroma component for the first position for each of the plurality of 2×2 superpixels depending on:

$$C_2''=(C_2'^{lt}+C_2'^{rt}+C_2'^{lb}+C_2'^{rb})/4; \text{ and}$$

wherein:

$C_2''$ indicates the second chroma component for the first position, and $C_2'^{lt}$, $C_2'^{rt}$, $C_2'^{lb}$, $C_2'^{rb}$ indicate the four updated chroma components to the left top, right top, left bottom and right bottom of the first position.

21. An apparatus according to claim 1, wherein the component transformator is configured to generate, from the first chroma component, from the second chroma component, and from the luma component of each position of each of the plurality of 2×2 superpixels, a red sample value, a green sample value, and a blue sample value for each of the plurality of 2×2 superpixels of the image to obtain an RGB image.

22. An apparatus according to claim 21, wherein the component transformator is configured to generate the red sample value, the green sample value, and the blue sample value depending on $$G=Y-(2^{w2}\times C_2+2^{w1}\times C_1)/4$$

$$R=C_1+G$$

$$B=C_2+G,$$

or depending on $$G=Y-(2^{w1}\times C_1+2^{w2}\times C_2)/4$$

$$R=C_2+G$$

$$B=C_1+G;$$

and wherein:

G indicates the green sample,

R indicates the red sample,

B indicates the blue sample, $C_1$ indicates the first chroma component, $C_2$ indicates the second chroma component, Y indicates the luma component, w1 indicates a first weight being a first integer, and w2 indicates a second weight being a second integer.

23. An apparatus according to claim 1, wherein the image information is obtained from encoded information and the encoded information comprises an encoding of the image in an ISO/IEC 21122 encoding format.

24. An apparatus according to claim 1, wherein the apparatus is configured to generate the at least three sample values for each of the plurality of 2×2 superpixels in parallel to generate a Bayer pattern reconstruction of the image.

25. A method for reconstructing an image from image information comprising a plurality of 2×2 superpixels of the image, wherein each of the plurality of 2×2 superpixels comprises one first chroma component at a first position of the 2×2 superpixels, one first luma component at a second position of the 2×2 superpixels, one second luma component at a third position of the 2×2 superpixels, and one second chroma component at a fourth position of the 2×2 superpixels, wherein the method comprises:

determining a luma component for each of the first position and the fourth position of each of the plurality of 2×2 superpixels depending on luma components at respective neighboring positions of the first position and the fourth position within the image, depending on a respective chroma component at the first position and the fourth position, and depending on chroma components at respective neighboring positions of the first position and the fourth position within the image;

conducting alias cancellation by determining a first updated chroma component for the first position for each of the plurality of 2×2 superpixels depending on the first chroma component at the first position, depending on the luma component at the first position, and depending on luma components at neighboring positions of the first position within the image; and determining a second updated chroma component for the fourth position for each of the plurality of 2×2 superpixels, using depending on the second chroma component at the fourth position, depending on the luma component at the fourth position, and depending on luma components at neighboring positions of the fourth position within the image;

determining a first chroma component for each of the second position, the third position and the fourth position of each of the plurality of 2×2 superpixels depending on first updated chroma components at respective neighboring positions of the second position, the third position, and the fourth position within the image;

determining a second chroma component for each of the first position, the second position and the third position of each of the plurality of 2×2 superpixels depending on second updated chroma components at respective neighboring positions of the first position, the second position, and the third position within the image; and generating, from the first chroma component or from the first updated chroma component, from the second chroma component or from the second updated chroma component, and from a luma component of each position of each of the plurality of 2×2 superpixels, at least three sample values for each position of each of the plurality of 2×2 superpixels.

26. A method according to claim 25, wherein determining the luma component for each of the first position and the fourth position of each of the plurality of 2×2 superpixels comprises:

for each of the first position and the fourth position, determining a first luma candidate value depending on two luma components at neighboring positions in a vertical direction within the image, determining a second luma candidate value depending on two luma components at neighboring positions in a horizontal direction within the image, and selecting the luma component from the first luma candidate value and the second luma candidate value depending on a selection criterion.

27. A non-transitory computer-readable medium comprising computer-readable instructions, which, when being executed by a computer or signal processor, carry out the method according to claim 25.

28. A camera comprising a JPEG XS encoder for generating an encoded signal encoding an image, wherein the camera comprises a preview monitor, and a processor that decodes the encoded signal according to the method of claim 25 to obtain an RGB image.

29. A camera comprising a JPEG XS encoder for generating an encoded signal encoding an image, wherein the camera comprises a preview monitor and a processor for obtaining an RGB image, and wherein the processor functions as an apparatus according to claim 1.

* * * * *